United States Patent [19]

Lipton et al.

[11] Patent Number: 5,063,441
[45] Date of Patent: Nov. 5, 1991

[54] STEREOSCOPIC VIDEO CAMERAS WITH IMAGE SENSORS HAVING VARIABLE EFFECTIVE POSITION

[75] Inventors: Lenny Lipton, Greenbrae; Lawrence D. Meyers, Mill Valley, both of Calif.

[73] Assignee: StereoGraphics Corporation, San Rafael, Calif.

[21] Appl. No.: 595,595

[22] Filed: Oct. 11, 1990

[51] Int. Cl.[5] ............................................. H04N 13/00
[52] U.S. Cl. ........................................ 358/88; 358/91; 358/213.11; 358/225
[58] Field of Search ................ 358/88, 91, 92, 213.11, 358/225; 354/112

[56] References Cited

U.S. PATENT DOCUMENTS

| | | | |
|---|---|---|---|
| 4,601,053 | 7/1986 | Grumet | 358/88 X |
| 4,631,580 | 12/1986 | Taube et al. | 358/88 |
| 4,751,570 | 6/1988 | Robinson | 358/88 |
| 4,791,478 | 12/1988 | Tredwell et al. | 358/88 |
| 4,805,015 | 2/1989 | Copeland | 358/88 |
| 4,858,157 | 8/1989 | Murai et al. | 358/88 X |
| 4,873,572 | 10/1989 | Miyazaki et al. | 358/88 X |
| 4,924,247 | 5/1990 | Suzuki et al. | 354/221 |
| 4,926,257 | 5/1990 | Miyazaki | 358/98 |
| 4,956,705 | 9/1990 | Wright | 358/88 |

Primary Examiner—Victor R. Kostak
Attorney, Agent, or Firm—Limbach, Limbach & Sutton

[57] ABSTRACT

A still or moving image electronic stereoscopic video camera for image capture and playback, with image sensors having variable effective position to avoid inherent geometric distortions which would otherwise cause undesirable vertical parallax. Horizontal shifting of the effective image sensor position is used to correctly converge the image without the introduction of distortion, and optionally also to control recentration of zoom optics, and to achieve interdigitated lenticular stereoscopic displays. In some embodiments, simple mechanical elements are provided for physically moving the imaging sensor.

24 Claims, 9 Drawing Sheets

STEREOSCOPIC VIDEO CAMERAS WITH IMAGE SENSORS HAVING VARIABLE EFFECTIVE POSITION

FIELD OF THE INVENTION

The invention is a stereoscopic video camera for the videography of still or moving images. Methods for creating the proper format for storage and display are given, as are methods for setting and tracking convergence and correcting for the recentration of optics.

BACKGROUND OF THE INVENTION

Prior electro-stereoscopic video cameras described in the literature are of the type discussed by U.S. Pat. No. 4,583,117, to Lipton, et al., or the type described by U.S. Pat. No. 4,879,596, to Miura, et al. In the former case, two individual video camera heads (consisting of lenses and image sensors) are used, mounted on a base, to provide the two perspective viewpoints. In the latter disclosure, two video cameras are used, but packaged in a more pleasing manner to provide the appearance of an integral camera. In both cases, two sets of lenses and image sensors are employed, and in both cases, the image is displayed field-sequentially so that left and right perspective viewpoints are alternated. When viewed through shuttering devices each eye sees only its appropriate perspective viewpoint, and the result is an image perceived with the depth cue stereopsis.

Electronic stereoscopic video cameras have been sold for applications such as teleoperations using the field-sequential approach, following the art taught in U.S. Pat. Nos. 4,583,117 and 4,523,226 [both Lipton et al.] and for amateur applications the above referenced U.S. Pat. No. 4,879,596 [Miura et al.] has been recommended. In addition, systems using the technology described in U.S. Pat. No. 4,562,463 [Lipton] have been demonstrated at various trade shows.

In the case of U.S. Pat. No. 4,523,226 and the related U.S. Pat. No. 4,583,117, flickerless images result, but each eye will see an image with half the number of video lines which can be displayed in the planar image using the same bandwidth. The restoration of the full complement of lines per eye is achieved with image storage, using devices called scan converters or line doublers available from JVC, Sony, Macrodata, and others.

The technology described in U.S. Pat. No. 4,562,463 can produce a flickerless effect while maintaining the full complement of lines for each eye by storing the scanned video fields and playing back each field twice, at twice the vertical rate at which it was read.

Both of these means are upwardly compatible with regard to the existing video infrastructure. That is to say, for NTSC, PAL, or SECAM video, the image may be transmitted or stored using unmodified hardware.

A number of proposals have been made with regard to selection devices employed for the display of such images. Two such proposals by Lipton et al., in U.S. Pat. Nos. 4,792,850 and 4,884,876, describe respectively means using passive and active eyewear. Products using the art described in these two patents have been manufactured by StereoGraphics Corporation, and are in use by persons in fields such as molecular modeling, aerial mapping and for various other applications. The technique described in U.S. Pat. No. 4,523,226, mentioned above in the context of video systems, has proved to be a cost effective means for formatting flickerless computer generated images for stereoscopic display from unmodified computer hardware.

In the past few years, a number of people have begun to use electronic stereoscopic displays for computer graphics. On the other hand, the field of stereoscopic television and video cameras has lagged behind, in part because there are no integral camera units which can meet the performance standards set in the field of electro-stereoscopy for computer graphics.

The only integral stereoscopic video camera is one which was produced under U.S. Pat. No. 4,879,596 to Miura et al. However, the convergence technique described in that patent will create images that have geometric distortion. FIG. 1 (taken from U.S. Pat. No. 4,879,596) shows the arrangement used for converging the lenses on a subject which is to appear in the plane of the display screen. Such a rotation of the lenses and image sensors must always result in geometric distortion as illustrated in FIGS. 2a and 2b. It has been understood in the literature of stereoscopy that such rotation will create what is sometimes called "keystoning". This is a geometric distortion with a resultant misalignment of corresponding points in the vertical direction, producing undesirable vertical parallax.

Rotation of the rectangle shown in FIG. 2a about the dotted line representing a vertical axis will result in a change in the length of the vertical sides AC and BC, to image of the now longer side $A^1C^1$ and now shorter side $B^1D^1$, as shown in FIG. 2b. This rotation is the geometric equivalent of that which is produced by the rotation of the camera heads shown in FIG. 1. When viewing such an image stereoscopically the eyes will be called upon to fuse corresponding image points with vertical parallax. The eyes are not called upon to do this when looking at objects in the visual world and the effort of fusing images with vertical parallax uses the muscles of the eyes in an unusual manner. Most people will experience this as a source of discomfort.

When the video camera heads, lenses and sensors, are rotated as called for by Miura, this is the result, and the geometric distortion is especially serious for objects which are close to the lenses or if wide angle optics are employed. This phenomenon is described in a paper by John Baker ["Generating Images for a Time-Multiplexed Stereoscopic Computer Graphics Systems," Proceedings of the SPIE-ISOE, Vol. 761, 1987.] Baker discusses the cure for the distortion, namely the use of cameras with parallel lens axes, and accomplishing convergence through horizontal shifting of left and right image fields. This technique is also given in Lipton's U.S. Pat. No. 4,523,226.

The means for preventing the occurrence of geometric distortion for video camera produced images as set forth herein may also be used to produce superior results when applied to the elimination of the generation of spurious parallax because of recentration of zoom lenses, described by Lipton in U.S. Pat. No. 4,418,993.

SUMMARY OF THE INVENTION

This invention is an integral and compact electronic stereoscopic camera for either moving or still images. This camera has means for controlling convergence, which may be set either manually or automatically, through methods which do not induce the geometric distortion described above. The camera provides for following the recentration of zoom optics, or recentration which results from focusing as described in Lipton's U.S. Pat. No. 4,418,993. The preferred means for achieving convergence control or recentration tracking is by the shifting of the image sensors, or active portions of the sensors, by various means, with respect to lenses which remain physically fixed in place, with their lens axes remaining perpendicular to the plane of the image sensors, as will be described.

In addition, provision is made for changing the interaxial separation of the lenses to control the stereoscopic effect from strong to weak for close-ups or distant objects.

Further, the formatting or multiplexing approach is described for producing the necessary sequence of fields to produce a proper stereoscopic picture.

DESCRIPTION OF THE PREFERRED EMBODIMENTS

Figure 1:
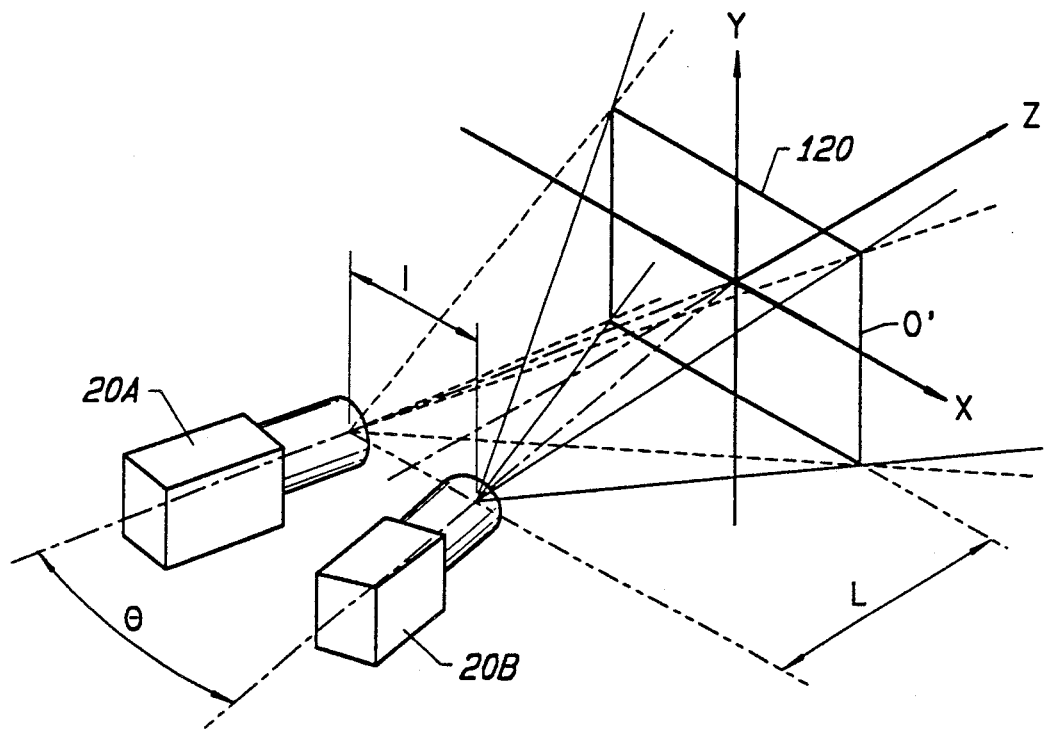
FIG. 1 is a prior art system, employing converging stereoscopic video camera lenses.

FIG. 1 is a prior art drawing taken from Miura et al., U.S. Pat. No. 4,879,596. In FIG. 1, camera heads 20a and 20b are rotated through angle theta to achieve convergence. Each camera head consists of a lens which forms an image on a light sensitive sensor such as a CCD array. Head 20a provides the left perspective viewpoint and head 20b the right perspective viewpoint. The camera lenses are separated by distance "l" and the distance from the cameras, or their lenses, to the plane of convergence 120, in the visual world is given by distance L. The two camera heads' fields of view coincide on rectangular area 120, with the axes of the two lenses crossing at the intersection of lines X and Y. An object intersecting plane 120 will be imaged to appear in the plane of the display screen.

The reason for this is given in some detail in Lipton, *Foundations of the Stereoscopic Cinema*, Van Nostrand Reinhold, 1982, and in Spottiswoode and Spottiswoode, *Stereoscopic Transmission*, University of California Press, 1953. Lipton calls this type of projection or display system a crossed lens axis system, and Spottiswoode and Spottiswoode call it a zero center line system. In such a system images of objects which have zero parallax—in other words, corresponding image points are aligned on top of each other—will appear to be in the plane of the display screen. Objects which have crossed, or negative, parallax will appear to be in front of the display screen, and objects which have uncrossed, or positive parallax, will appear to be within or behind the display screen. It is therefore of fundamental importance when creating stereoscopic videographed images to control the plane of convergence at the time of photography.

Figures 2A, 2B:
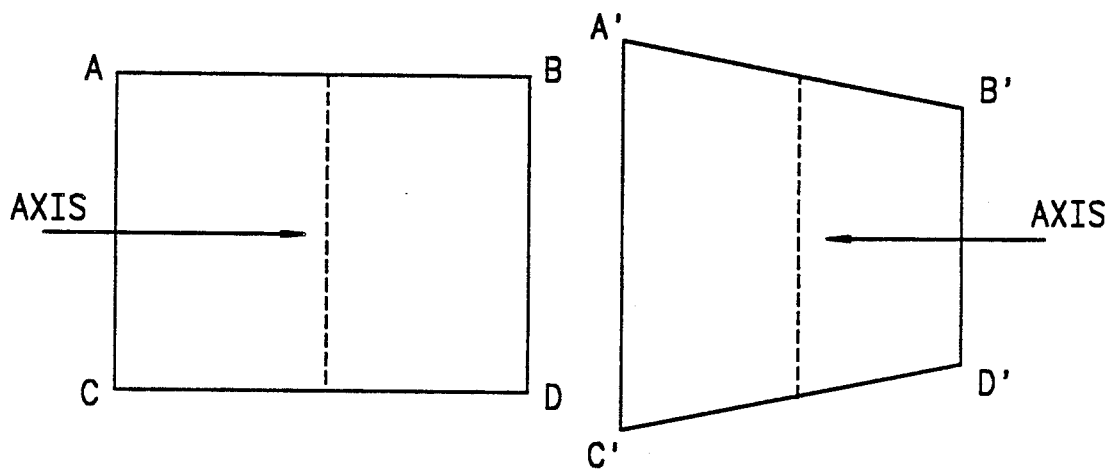
FIGS. 2a and 2b show the geometric distortion that results from the method of rotation of lenses to produce convergence.

While the need for locating the volumetric extent or location of an image with respect to the surface of the display screen is an important concern, we can see from FIGS. 2a and 2b, as discussed above, that the rotation of the camera heads 20a and 20b, will produce geometric distortion. This geometric distortion or keystoning will produce vertical parallax for the image points shown in Rectangle A,B,C,D. Vertical parallax, as is well known, is not desirable in stereoscopic displays because the eye muscles will need to rotate in an unaccustomed vertical direction to fuse corresponding image points A and $A^1$, B and $B^1$, and so forth. For just about any conceivable object, except for one with bilateral symmetry, such as a sphere or a cylinder, geometric distortion will result from the rotation of the lens axes as shown in FIG. 1 as taught by Miura et al.

Figure 5A:
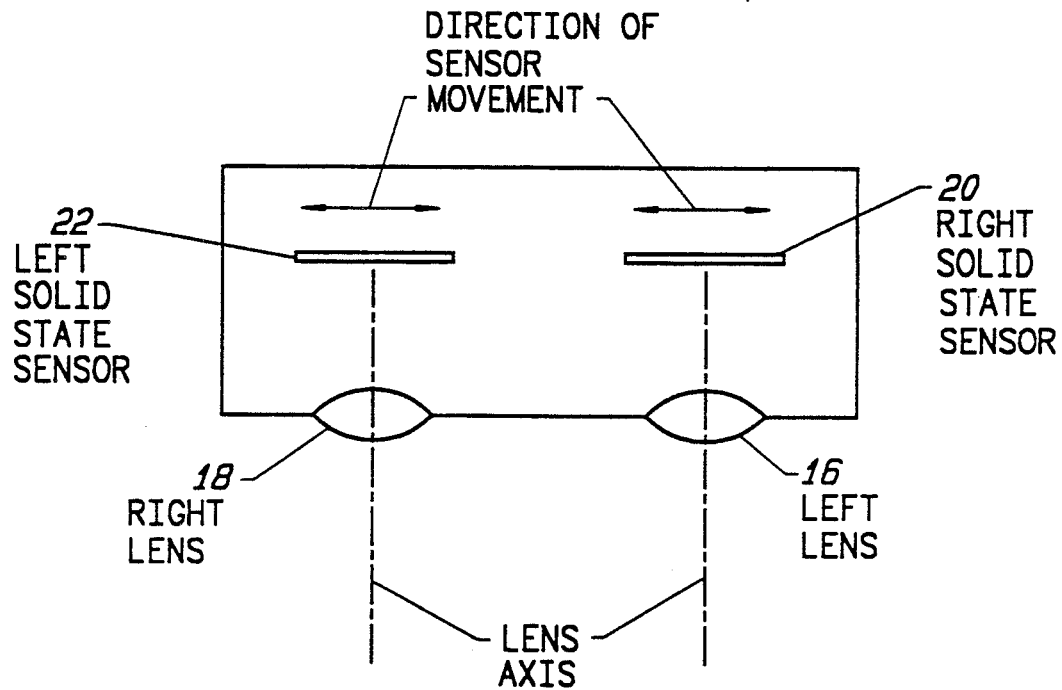
FIGS. 5a, 5b, 5c, and 5d are the layouts of integral electro-stereoscopic cameras which embody the invention, indicating the direction for horizontal shifting of the sensors for convergence control, and means for moving the sensors.

The cure for the problem is to use cameras whose lens axes are parallel, and remain parallel, as shown in FIG. 5a. If the lens axes remain parallel, then convergence can be effected through horizontal shifting of either one or both of the image sensors.

A better term to use than convergence in this case might be zero parallax setting (ZPS), since we are seeking to produce zero parallax for selected image points without resultant geometric distortion to any of the corresponding image points.

There are several ways in which such horizontal shifting can be achieved. In one case, the lens or lens elements can be shifted in the horizontal direction so that the image will also be shifted in the horizontal direction. This is a technique which is well known to photographers who use view cameras or perspective control lenses. However, because of the mass of the lens, such horizontal movement of the lens can involve bulky mechanical controls and can be costly to implement. In addition, if it is desired to follow convergence, to maintain the image at the plane of the screen even if its distance to the camera changes, then smooth and continuous convergence control is desired. In such a case electric motors or other electromagnetic/mechanical devices, well known in the art, must move the entire lens or elements of the lens. As a more desirable alternative, we will describe means for moving the image sensor without recourse to moving the more massive and difficult to move lens or section of a lens.

Figure 3:
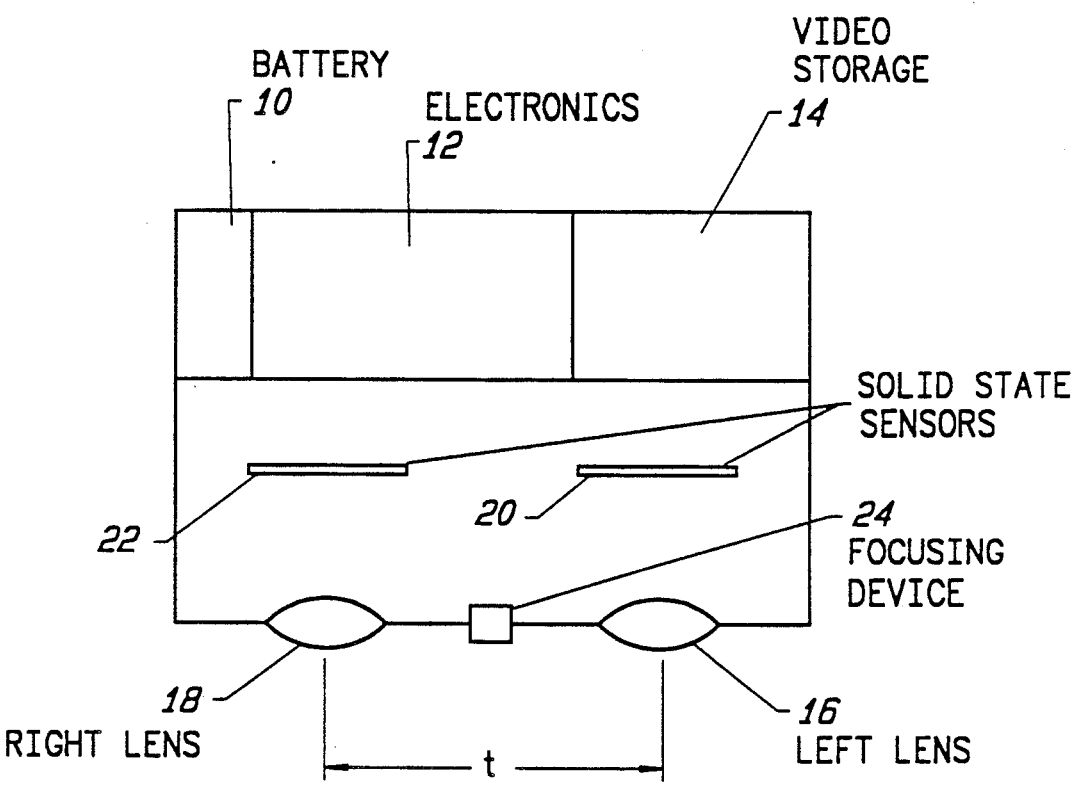
FIG. 3 is a schematic layout of a basic electrostereoscopic video camera of the invention.
Figure 5B:
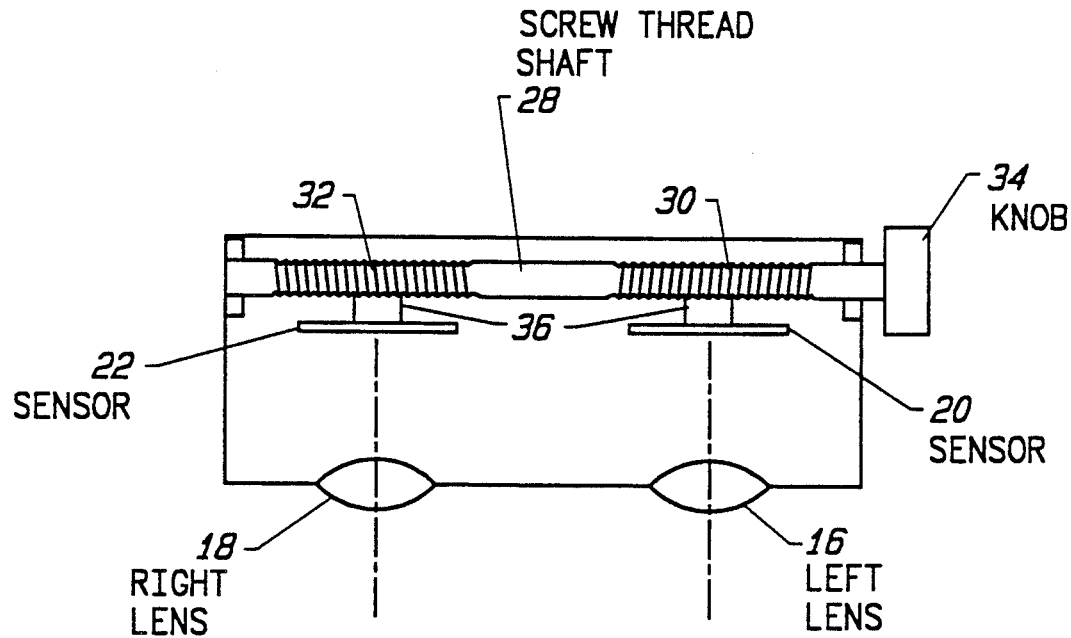

With regard to FIG. 5b, we can see that one means for controlling the ZPS is to horizontally shift the image surfaces themselves. Before we discuss this in any detail let us examine FIG. 3. FIG. 3 is an overall schematic of the basic layout of an electronic stereoscopic still or moving image video camera. We see the various functional assemblies or modules are laid out in a block diagram form. Typically there needs to be a battery 10, although the camera might just as well be powered from some external power supply. There will be a need for electronics controls 12 of various kinds, such as those associated with the image forming sensor, enabling it to output a video signal. There will also be a need for means 14 for storing the image, in particular in the case of an electronic still camera. Storage may also be required if the camera is a moving image video camera, which combines the functions of a video tape recorder with image capture functions.

We also see that left and right lenses 16 and 18 are separated by some inter-axial separation t, and each lens forms an image on its respective solid state image sensor (20 or 22). Without loss of generality, it would also be possible to use cathode ray tube imaging devices. However, in all likelihood, most, if not all, future video cameras, either still or moving image devices, will incorporate solid state sensors of any one of various types, such as charge coupled devices (CCDs) or other types of solid state mosaic devices. Also, let us point out that although a single image surface is shown, useful for monochrome, color video may be achieved if said image surface is made up of a mosaic covered with colored filters to produce a desired color image, or made up of two or more image surfaces which are placed in an optical system employing semi-silvered mirrors or beam-splitting prisms as a means to record appropriate portions of the visible spectrum.

We can also see (in FIGS. 3 and 5c) that an automatic focusing device 24 has been incorporated into the camera. Many modern video cameras, especially those for the amateur market, incorporate automatic focusing devices. These are of two types—active and passive devices. Active devices often emit an infrared or ultrasonic signal, which is reflected by an object in the visual world, and is then sensed by a device located on the camera to produce distance information. The other approach is to use a passive system which typically incorporates some means to opto-electronically evaluate the sharpness of the image. The distance information acquired by either type of device is used to control the focusing of the lens, usually in the form of a closed-loop servo system. Automatic focusing has become an important and useful feature, and is generally achieved by motor control of the focusing section of the zoom lens, or, in the case of simpler cameras, by moving the entire lens closer to or further away from the sensor.

With reference now again to FIG. 5a, we can see that the movement of the solid state sensor in a direction perpendicular to its axis (the "horizontal" direction in FIG. 5a) could be achieved by use of mechanical or electromechanical means, such as motors, solenoids, or other types of devices capable of moving the sensor in the horizontal direction. Such means are well known in the art. We have recognized that in a video system of this kind (in contrast with a film system), the sensors themselves may be readily moved, providing an opportunity to elegantly control the ZPS.

It is possible that such control could be manually set so that the zero parallax condition could be achieved, as shown in FIG. 5b. This horizontal shifting of the sensors, which could involve one or both of the sensors, can be achieved by simple mechanical means as shown in FIG. 5b. Here, a rod 28 with screw threads 30 and 32 cut in opposite directions, on each half of the rod, forms part of a dual worm gear device. The screw threads move the left and right image sensors 20 and 22 in equal and opposite directions when knob 34 is turned. A worm gear device 36 is used to move each sensor. The sensor or sensors continue in their electrical interface by means of flexible connectors or cables. The setting can be achieved by means of a scale, marked in feet or meters, to enable the videographer to control the ZPS. It will be obvious to a person of ordinary mechanical skill that this dual worm gear approach is only one of many which might be applied here, and we do not mean to limit ourselves to this one means.

Figure 5C:
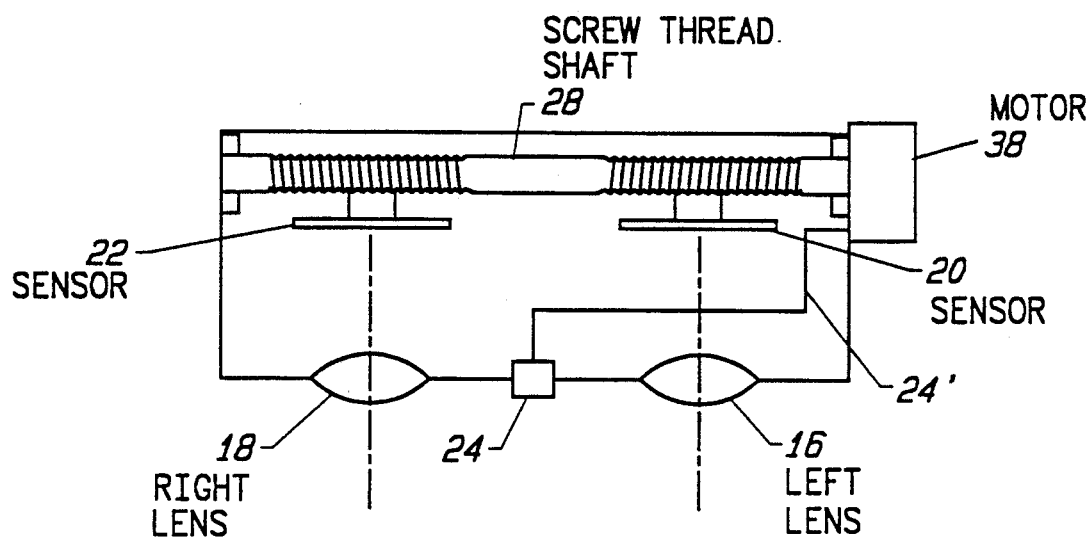

An alternative is shown in FIG. 5c in which a motor 38 is coupled to the device shown in FIG. 5b, and used to control the sensors' horizontal position. Motor control would allow for the automatic tracking or following of convergence if it were controlled by a control signal from auto focus sensor 24 (connected by line 24' to motor 38). By such a means the object which is kept in focus by an automatic focus means could also be kept in the plane of the display screen. This, or some variation of the idea, might be acceptable for the great majority of subjects.

The concept of interlocking focussing and convergence is discussed in the literature and Spottiswoode, Spottiswoode and Smith (Journal of the SMPTE, Oct. 1952, Vol. 59) cite the work of Dewhurst and Bodrossy.

It is possible to process the control signal from auto focus sensor 24 in any of several different ways. The user may select from among these ways to cause the zero parallax condition for images automatically to track at the plane of sharp focus, or in front of or behind the plane of sharp focus, so that the image of the object of interest appears at the plane of the screen, behind or in front of the plane of the screen. We contemplate that such a user selectable option could be built into an autofocusing/ZPS system.

Figure 5D:
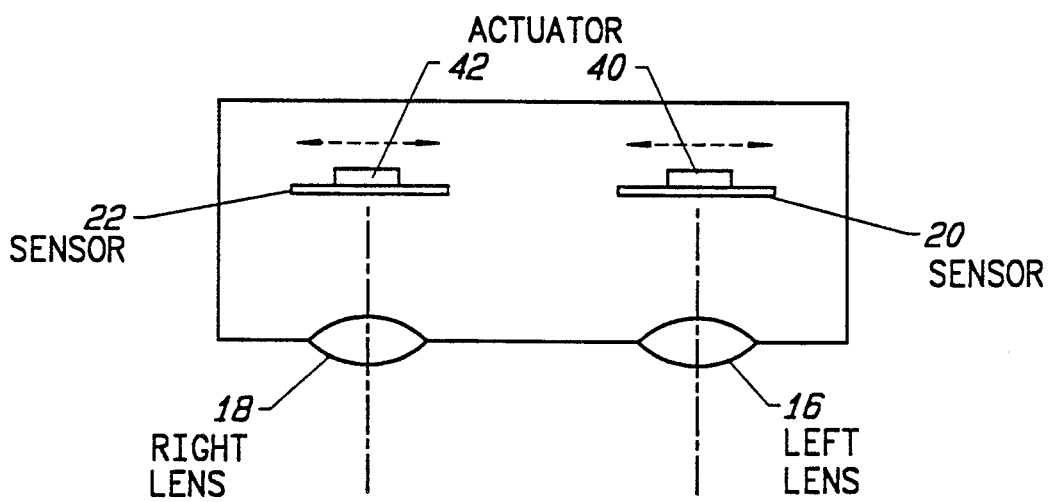

FIG. 5d is a variation on the concept described with the aid of FIG. 5c and differs in that it uses two independent actuator means (40 and 42) to move sensors 20 and 22 independently. There are various well known electromechanical means to horizontally move such sensors. If cost of manufacture was an overriding consideration then it would be acceptable to provide only actuator means 40 or actuator means 42, to move only one of sensors 20 and 22, but as we shall see below, superior optical results may well be obtained by moving both sensors. If two sensors are employed it is desirable to move both in equal and opposite directions.

Figure 5E:
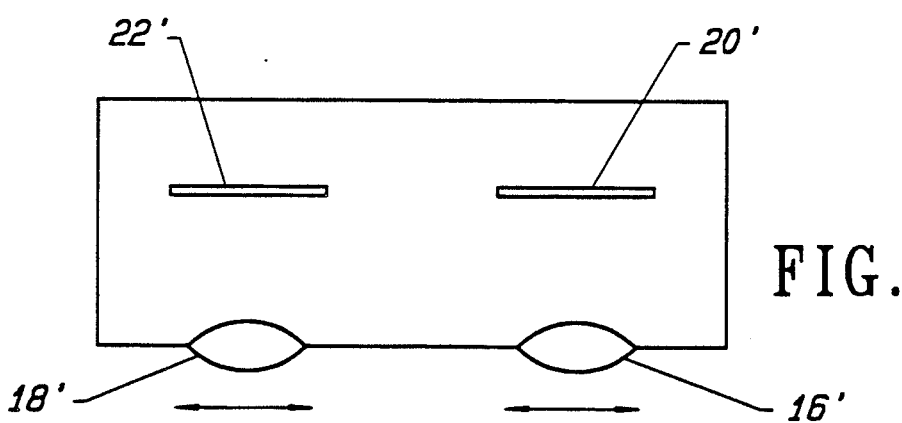
FIG. 5e is the layout of an alternative embodiment of the inventive integral electro-stereoscopic camera, indicating the direction for horizontal shifting of the lenses relative to the sensors.

With reference to FIG. 5e, in an alternative embodiment of the invention, left and right sensors 22' and 20' are fixedly mounted (with substantially parallel axes), and either or both of left and right lenses 18' and 16' are mounted (with substantially parallel axes) for movement in a direction (the "horizontal" direction shown by the arrows in FIG. 5e) perpendicular to their axes by use of mechanical or electromechanical means, such as motors, solenoids, or other types of devices which could move the lenses in the horizontal direction. Such means are well known in the art.

Figure 6:
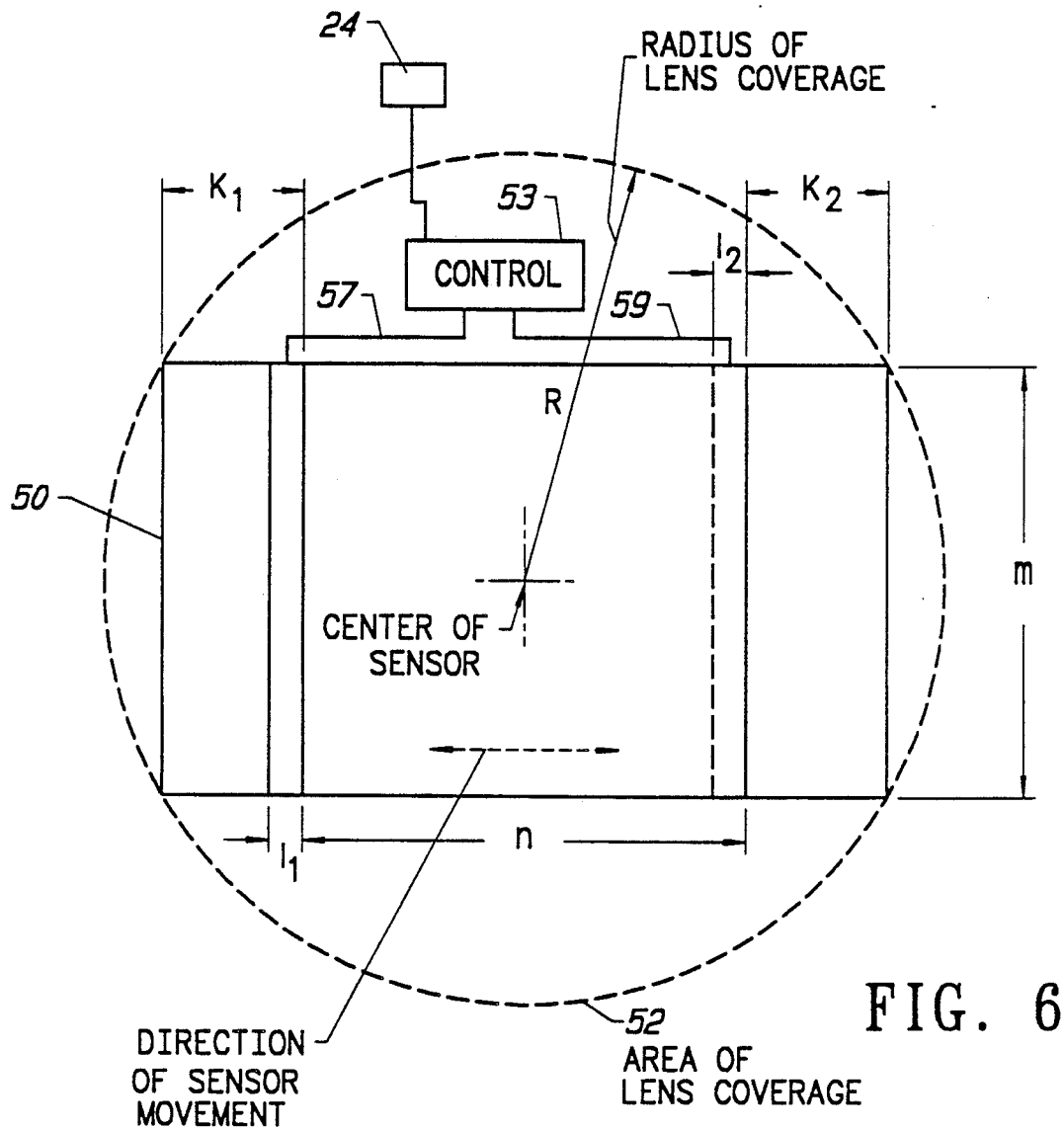
FIG. 6 is a diagrammatic representation of a solid state sensor with variably addressed columns to maintain the aspect ratio of the image while effectively shifting the image center to control convergence.

FIG. 6 is a drawing of a sensor 50 which is located behind a lens which remains in a fixed relationship to the sensor, and whose axis remains perpendicular to the plane of the sensor surface. Sensor 50 may be either the left or right sensor. In FIG. 6 we see that the radius of lens coverage R, is larger than the imaging area of nm. Dimensions nm are for today's standard video aspect ratio, and the value of n/m is 1.3:1. This aspect ratio could be any desired value, without loss of generality, such as 2:1 which has been advocated for certain high definition television systems. The area within the radius of lens coverage R, is defined as the circular area 52, which contains well corrected image points which do not suffer from excessive vignetting or aberration. It is well known in the art of photography, especially with regard to the use of view cameras which need to employ tilts and swings and lateral shifts of lenses, that it is important to employ lenses with good coverage of larger than the film format so that tilts, swing, lateral shifts, and so forth can be achieved having good photographic quality across the entire surface of the film. The same concerns apply here to the usable image area or lens coverage and the imaging surface since that surface will be moved with respect to the lens axis. It is assumed that the center of the full imaging array shown in FIG. 6 will be intersected by the lens axis.

P, the total number pixels of the video sensor is given by the product of $n_p m_p$, which is the product of the total number of pixels in the columns and rows. Additional areas $k_1 m$, and $k_2 m$, on either ends of area nm are provided. These additional areas make the overall dimensions of the sensor equal to $2km + nm$. It is possible to effectively horizontally shift the sensor by electronically scanning selected columns of pixels, by selectively enabling and disabling individual columns of pixels using control circuit 53. For example, pixel columns are located in areas $l_1 m$ and $l_2 m$ lies within area nm, and $l_1 m$ lies outside of area nm. When sensor control circuit 53 sends appropriate signals though lines 57 and 59 to switch $l_1 m$ on and $l_2 m$ off (or to switch $l_1 m$ off and $l_2 m$ on), this creates the effective lateral shifting of image sensor 50 and repositions the location of the center of the imaging surface, given a fixed intersection of the lens axis. In fact, any number of columns from one end of the array can be turned on using control circuit 53, and the same number of columns at the other end of the array can be turned off, to laterally shift the active image surface within the bounds of horizontal dimension $2k + n$. We note that the aspect ratio n/m will remain constant if as many columns are added as are subtracted in the process described.

The essence, then, of the method is to switch on and off appropriate columns located at opposite horizontal ends of the sensor array or matrix, as shown in the drawing and as described in the text to, in effect, horizontally shift the image sensor to provide a new center for the image field. By such means the ZPS may be achieved for the desired objects.

Control circuit 53 may operate under the control of a control signal from auto focus means 24, in the same way that motor 38 (of FIG. 5c) may operate under control of a control signal from auto focus means 24. By such a means the object which is kept in focus by automatic focus means 24 may also be kept in the plane of the display screen. More generally, control circuit 53 may be operated in any of a variety of modes, including for example a mode in which it processes the control signal from auto focus means 24 to maintain the camera's zero parallax point coincident with the focal point, a mode in which it processes the control signal from auto focus means 24 to maintain the zero parallax point in front of the focal point, and a mode in which it processes the control signal from auto focus means 24 to maintain the zero parallax point in back of the focal point.

Figure 10:
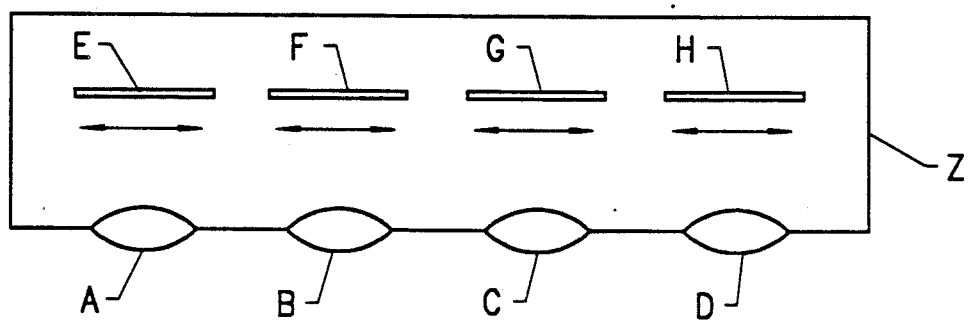
FIG. 10 is a drawing of a multiple lens stereoscopic video camera for capturing images to be presented as interdigitated parallax stereograms.
Figure 11:
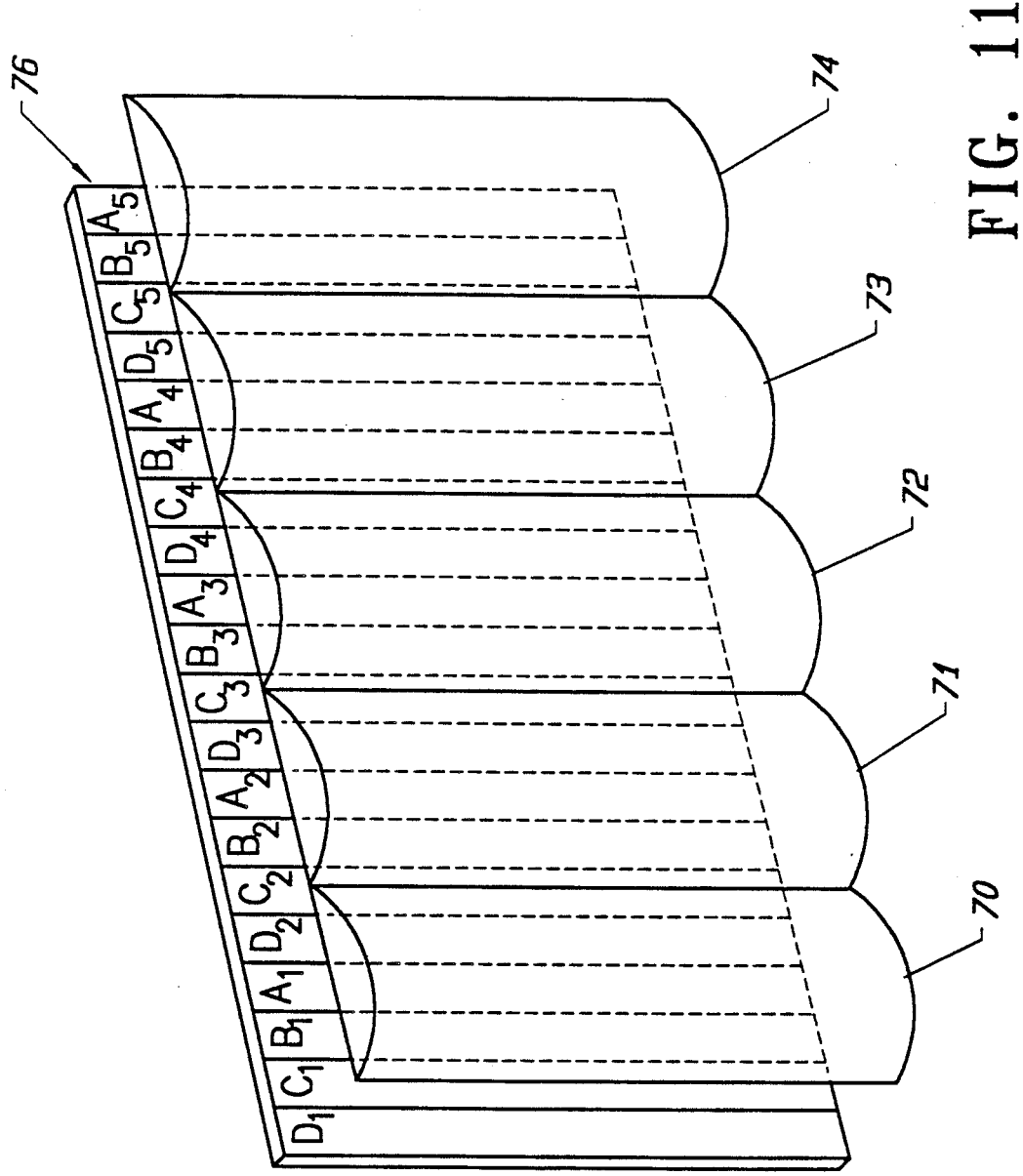
FIG. 11 is a closeup view of the picture elements and lenticules of an interdigitated parallax video stereogram.

FIG. 10 is a stereoscopic video camera of the same general type described above, but designed for the production of interdigitated parallax stereograms of the type offered by Nimslo and others. To produce this kind of display, the FIG. 10 camera includes lenses A, B, C, and D, and sensors E, F, G, and H. Each one of the lenses receives a different perspective view, having a relationship to the other lenses in that it is horizontally shifted by some distance. The images received at the sensors are interdigitated or sliced into vertical columns, and a set of such columns is intimately juxtaposed behind its own lenticule of a display screen as shown in FIG. 11.

This art is in general, well known, and the lenticules are of a type that are in the form of columns of cylinders which resemble corduroy in configuration. In accordance with the invention, each of sensors E, F, G, and H is translatably mounted within housing Z for horizontal motion (in the direction of the arrows shown in FIG. 10). FIG. 11 shows an arrangement of image strips 76 and lenticules 70–74 which are produced using the camera shown in FIG. 10. In FIG. 11, there are four image strips 76 behind each lenticule. The unique subscript for each set of four image strips indicates that the image information is different for each lenticule. It will be obvious to those skilled in the art that the means for producing ZPS for a field sequential plano-stereoscopic display, described herein, can also be applied to an interdigitated lenticular display. The means for interdigitating the images produced by sensors E, F, G, and H is beyond the scope of this disclosure, as is a description of the type of display screen employed to form the columns of images which are juxtaposed with the lenticules. Moreover, this disclosure is not limited to the case that the camera has four lenses, as shown in FIG. 10 and implied in FIG. 11. Rather, and any number of lenses (and corresponding sensors) may be used, providing the number of lenses and sensors employed is two or greater.

Lipton, in U.S. Pat. No. 4,418,993, describes the problems associated with zoom lenses as applied to the creation of stereoscopic images. The principal problems have to do with recentration of optics with changes of focal length, as mentioned in the aforementioned patent, as recentration may occur with changes in focus. As zoom lenses are zoomed, the optical center of the zoom lens tends to wander away from the center of the image field. Such wandering is of little concern for normal videography, but for stereoscopic videography the comparative wanderings of two image centers will produce unwanted parallax in both the vertical and horizontal directions.

Figure 7:
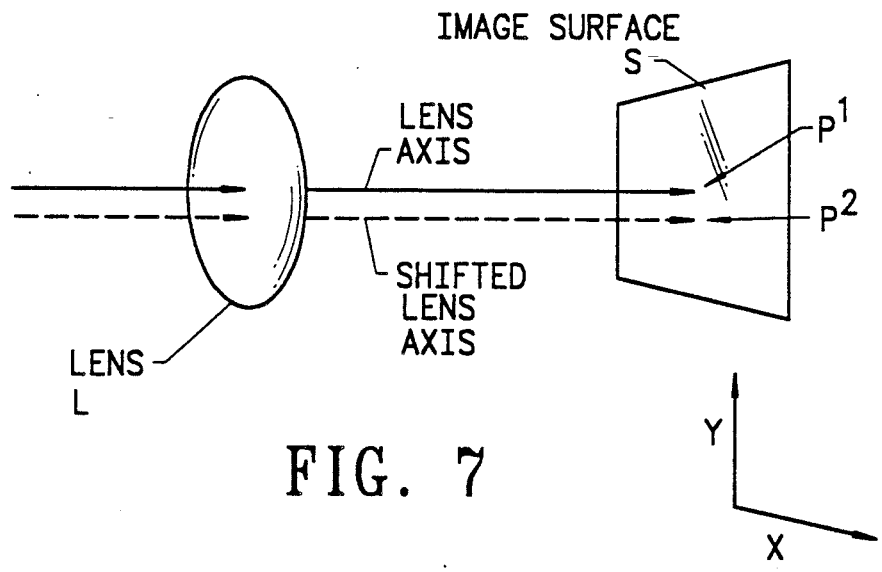
FIG. 7 is a representation of the optical center of a zoom lens, showing how it may move during zooming, with respect to a fixed image center.

FIG. 7 shows what happens to the original lens axis of lens L, as the focal length of the lens changes. Initially the lens axis intersects the imaging surface S of the sensor, which lies in a plane perpendicular to the lens axis, at point $P^1$. With a change in focal length the lens axis moves to that shown by the dotted line, which intersects the plane of the image surface at point $P^2$, some distance from $P^1$. It is possible to chart the XY coordinates of the change in location of the intersection of the lens axis with the imaging surface as a function of focal length, and to store that information by any one of a variety of means. A sensor located on the lens mount is needed to detect the position of the mount with reference to the changes in focal length so that it may be referenced to the experimentally determined value of location of the intersection of the moving axis with the image plane. Means for this, using mechanical correction methods, have been given in the aforementioned U.S. Pat. No. 4,418,993.

Figure 8:
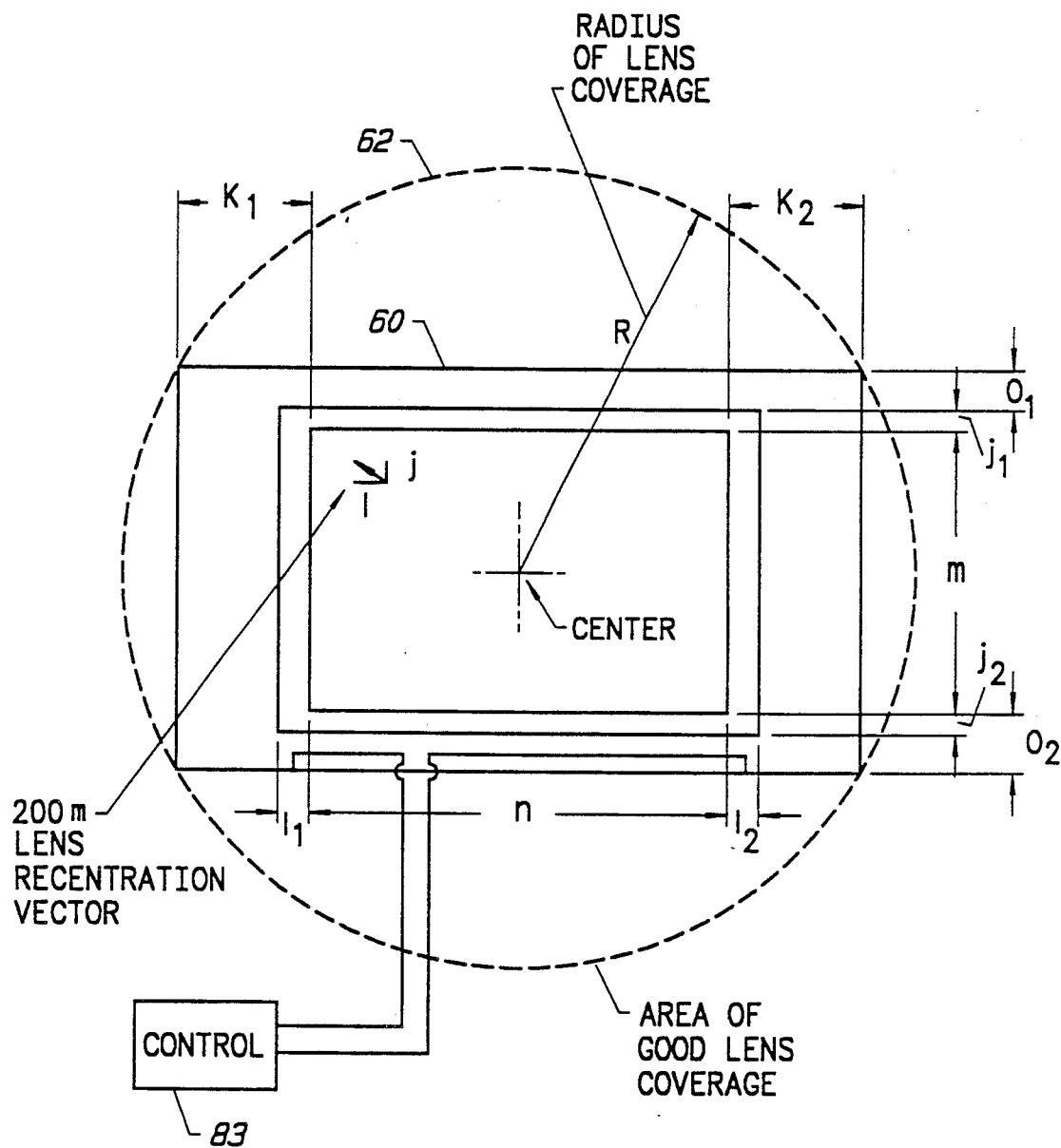
FIG. 8 is a diagrammatic representation of a solid state sensor with variably addressed columns and rows to maintain with aspect ratio of the image while effectively shifting the image center to track for changes in the recentration of zoom lens optics while such lenses change focal length.

Here, however, we are concerned with means similar to that given above with regard to movement of the imaging surface for ZPS control. Shown in FIG. 8 is image surface 60 with dimensions $n+k_1+k_2 \times m+O_1+O_2$, which contains image area nm, with center as shown. As zoom lens 62 changes focal length away from the value that places its axis at a point which intersects the center of nm, the location of the intersection with changing focal length may be kept in the middle of the active image field horizontally and vertically by means of scanning appropriate column and rows of pixels forming the active image area of the sensor surface.

In FIG. 8 the arrow pointing to the upper left from the center, shows as an example the direction of a recentration vector associated with a change in focal length. On the imaging surface the result is a shift in the horizontal component by a shift to the left by distance l and to the top by distance j. If a vertical column equal to width l is turned off (by control circuit 83), within the right edge of the active image surface area nm, and an area equal to it in width is turned on at the left edge (by control circuit 83), then the center of the active imaging area is shifted in the horizontal to make up for the centration vector shift by distance l. Similarly, the active image may be raised by height j by following a similar procedure in the vertical direction. The effect of this is to move the active image area to follow the change in centration.

The information concerning the calibration of the lens with respect to the shift in centration may be stored in ROM, or some other convenient storage medium for interpretation by the electronic circuit responsible for moving the relative image center as described above. By tracking the centration change as a function of focal length for either or both the left and right zoom lenses, it is possible to produce an effective zero relative change in centration between the two image fields. This means will eliminate the production of spurious parallax which would otherwise make the resultant stereoscopic image difficult to view.

It is also possible to physically move the image sensors to track the changes in centration of the lenses as they zoom. Such means have been described above in the context of setting the ZPS, with the aid of FIG. 5d. In this case, rather than switching on and off appropriate sets of rows and columns of pixels, the stored recentration information is used to operate an electromechanical means of shifting the image sensors by the appropriate amounts in the vertical and horizontal directions.

The technique of switching on and off various rows and columns of pixels described above, illustrated with the aid of FIG. 8, may also be exploited to control the relative magnification of the images produced by the left and right zoom lenses. It is possible to calibrate the lenses so that information about their focal lengths is stored in memory with reference to the mechanical position of the zoom elements of the lens. Given the availability of such information, the size of the image sensor available for actively forming the image can be altered to compensate for mismatched lens magnification. If the lenses do not produce images with the same magnification, the resulting stereoscopic image will be difficult for the viewer to fuse.

Figure 9A:
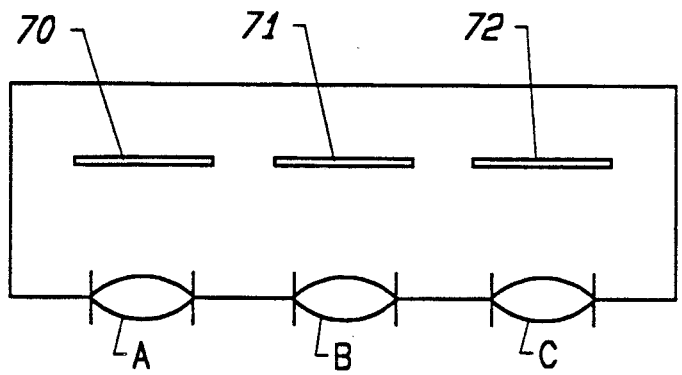
FIGS. 9a and 9b, are diagrams of integral electrostereoscopic video cameras using multiple or moving lenses in order to provide for changes in the strength of the stereoscopic effect b using different pairs of lenses with different inter-axial separations.

FIG. 9a is a camera which uses three heads made up of three sets of lenses A, B, and C, and their associated (translatably mounted) image sensors 70, 71, and 72, only two sets of which are employed at a time to produce stereopairs as taught herein. Lenses A and C are further apart than combinations B and C, or A and B, and A and C are used for objects which are more than a few feet from the camera. When objects are close to the camera, only a few feet or less away, then either A and B or B and C are used to reduce the inter-axial separation of the perspective view. It is well known in the art of stereoscopy that closeups require a reduced inter-axial separation for the images to have the proper stereoscopic effect and also in order to reduce the values of parallax so that the image may be comfortable to view. If the distance between A and B is different from the distance between B and C then there is the additional ability to select three different inter-axial distance so that settings for far, medium, and close objects may be provided. It should be understood that all of the techniques taught herein, for ZPS and recentration control are applicable to this arrangement of lenses and image sensors.

Figure 9B:
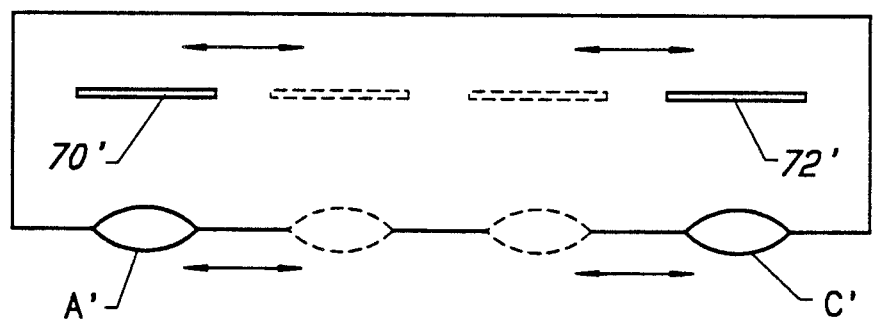

A moving image video camera may require a continuous change in inter-axial separation during a shot, and for this purpose the camera shown in FIG. 9b may be a more suitable arrangement. Here translatably mounted lenses A' and C' may be horizontally shifted continuously as the distance to the subject changes or as the lenses are zoomed. It will be understood that each image sensor 70' and 72' moves along with the moving lens and shifts in the horizontal direction along with the lens. Close objects require a reduced distance for the inter-axial setting, as does the use of shorter focal lengths. Conversely, longer focal lengths and greater object distances require a greater inter-axial separation. It should be understood that the art taught herein with regard to control of ZPS and recentration of zoom optics may be applied to this camera design.

Figure 4A:
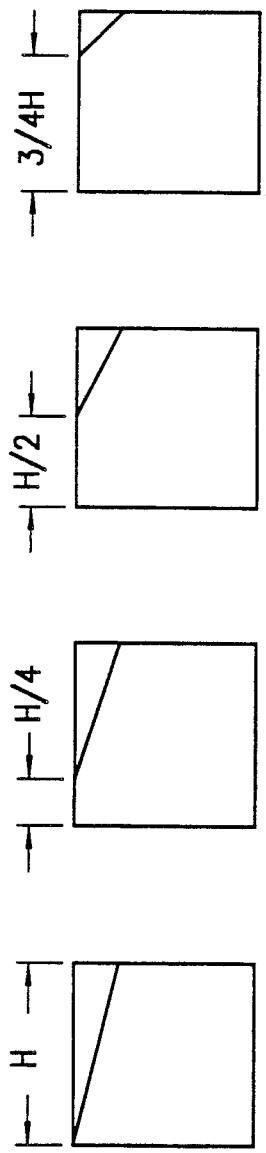
FIGS. 4a, 4b, and 4c are line scanning patterns for storage and playback of a stereoscopic picture.
Figure 4B:
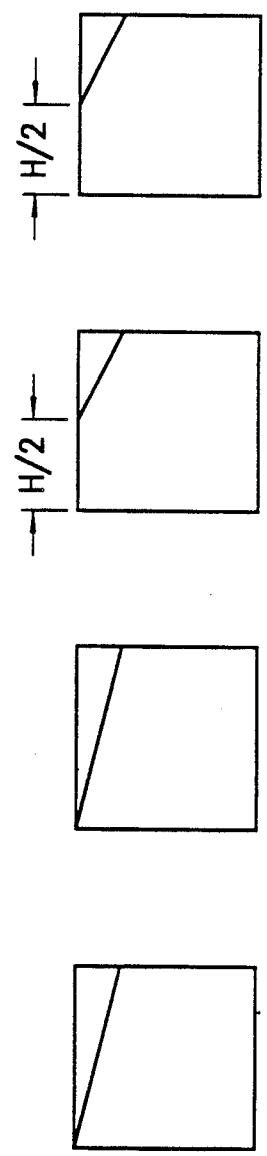
Figure 4C:
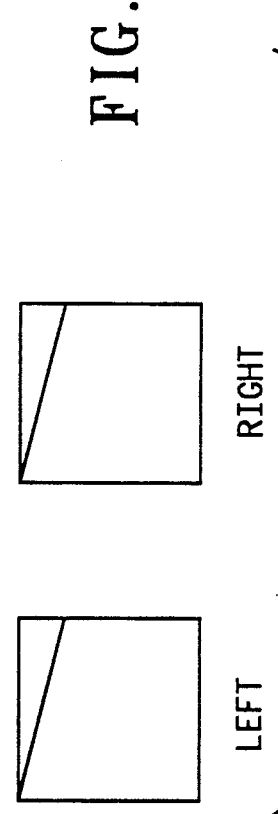

Electronic stereoscopic still or moving image cameras must output a video signal which can be viewed on a display screen. A flickerless image is desirable, and requires fields to be written as twice the usual vertical frequency employed for planar displays, as described in U.S. Pat. Nos. 4,562,463 and 4,523,226. We identify here three formats for playing back a stereoscopic image as shown in FIGS. 4a, 4b, and 4c. FIG. 4a uses a technique of four-fold interlace described by Lipton and Meyer (SID Digest, 1984, pp. 124-127). A stereoscopic frame or picture in this case is made up of four fields. Each eye will see either left or right fields and each eye will see a two-fold interlace. We see that the first field in the series of four fields making up one complete stereoscopic frame or picture, begins with the first line starting to write the image in the upper left have corner of the field. This is the left off field. The next field, the right odd field, begins a quarter of a line inward from the left corner, and the left even field begins writing half a line inward from the left corner. The final field of the set of fields making up the frame begins its first line writing three quarters of the way in from the left corner where the first line was written. This last field is the right even field.

An alternative to four-fold interlace is FIG. 4b which uses a dual two-fold interlace scheme in which each eye sees a two-fold interlace as a result of having seen alternative fields of two sets of two-fold interlaced fields. The first field making up a stereoscopic frame begin their scanning with lines starting at the extreme upper left corner of the field. They are the left odd and right odd fields. The next two fields are written with the first line in each starting half way in from the first line. They are the left even and right even fields.

Please note that the order of the fields in the descriptions above might just as well have been right, left, right, left, rather than left, right, left, right.

In the above two schemes for presenting a complete stereoscopic picture interlace was used and it is required to write four fields. The scheme given in FIG. 4c on the other hand, employs progressive or non-interlace scan to produce only two fields containing between them the complete image information of a stereopair of images. The left and right fields are each written with lines starting at the extreme upper left portion of the field. Persons familiar with the art will understand that there are possible variations to this scheme, but such variations are obvious after have revealed the basic ides.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A stereoscopic video camera, including:
   a housing;
   a left lens having a first optical axis and a right lens having a second optical axis, wherein the left lens and the right lens are fixedly mounted in the housing with the first optical axis substantially parallel to the second optical axis;
   a left image sensor mounted in the housing along the first optical axis and a right image sensor mounted in the housing along the second optical axis; and
   means for controlling the effective position of a first one of the left image sensor and the right image sensor to selectively expose said first one of the left image sensor and the right image sensor to different portions of an image focused by a corresponding one of the left lens and the right lens.

2. The camera of claim 1, wherein the means for selectively exposing the first image sensor includes a means for translating the corresponding image sensor linearly in a plane substantially perpendicular to the first optical axis.

3. The camera of claim 2, wherein the sensor translation means includes:
   a rotatable threaded shaft attached to the housing; and
   a worm gear device attached between the shaft and the first image sensor.

4. The camera of claim 3, wherein the sensor translation means also includes:
   motor means for rotating the threaded shaft in response to a control signal.

5. The camera of claim 4, also including an automatic focusing means, and wherein the control signal is generated by the automatic focusing means.

6. The camera of claim 5, wherein the control circuit processes the control signal so as to maintain the camera's zero parallax point in a desired relation with respect to a focal point determined by the automatic focusing means.

7. The camera of claim 6, wherein the control signal maintains the zero parallax point at any desired one of a first position coincident with the focal point, a second position in front of the focal point, or a third position in back of the focal point.

8. The camera of claim 1, wherein the selective exposure means includes:
   means for translating the left image sensor and the right image sensor linearly in a plane substantially perpendicular to the first optical axis.

9. The camera of claim 8, wherein the sensor translation means includes means for independently translating the right image sensor and the left image sensor.

10. The camera of claim 8, wherein the sensor translation means includes:
    a threaded shaft rotatably attached to the housing, and having a first threaded portion having a first parity and a second threaded portion having a parity opposite to the first parity;
    a first worm gear device engaging the first threaded portion and attached to the left image sensor; and
    a second worm gear device engaging the second threaded portion and attached to the right image sensor.

11. The camera of claim 10, wherein the sensor translation means also includes:
    motor means for rotating the threaded shaft in response to a control signal.

12. The camera of claim 1, wherein each of the left image sensor and the right image sensor is a solid state mosaic device.

13. The camera of claim 12, wherein the solid state mosaic device is a charge coupled device.

14. The camera of claim 1, also including:
    a third lens having a third optical axis, wherein the third lens is mounted in the housing with the third optical axis substantially parallel to the second optical axis;
    a third image sensor mounted in the housing along the third optical axis; and
    a means for selectively exposing the left image sensor to different portions of a first image focused thereon by the left lens, for selectively exposing the right image sensor to different portions of a second image focused thereon by the right lens, and for selectively exposing the third image sensor to different portions of a third image focused thereon by the third lens.

15. A stereoscopic video camera, including:
    a housing;
    a left lens having a first optical axis and a right lens having a second optical axis, wherein the left lens and the right lens are mounted in the housing with the first optical axis substantially parallel to the second optical axis;
    a first image sensor mounted in the housing along the first optical axis and a second image sensor mounted in the housing along the second optical axis;

a third lens having a third optical axis, wherein the third lens is mounted in the housing with the third optical axis substantially parallel to the second optical axis;

a third image sensor mounted in the housing along the third optical axis; and a means for selectively exposing the first image sensor to different portions of a first image focused thereon by the left lens, for selectively exposing the second image sensor to different portions of a second image focused thereon by the right lens, and for selectively exposing the third image sensor to different portions of a third image focused thereon by the third lens, wherein each of the first image sensor, the second image sensor, and the third image sensor is a solid state mosaic device having pixel rows and columns, and wherein the means for selectively exposing the first image sensor, the second image sensor, and the third image sensor includes a control circuit for activating selected ones of the pixel rows and columns.

16. A stereoscopic video camera, including:

a housing;

a left lens having a first optical axis and a right lens having a second optical axis, wherein the left lens and the right lens are mounted in the housing with the first optical axis substantially parallel to the second optical axis;

a left image sensor mounted in the housing along the first optical axis and a right image sensor mounted in the housing along the second optical axis; and means for selectively exposing a first one of the left image sensor and the right image sensor to different portions of an image focused by a corresponding one of the left lens and the right lens, wherein the first one of the left image sensor and the right image sensor is a solid state mosaic device having pixel rows and columns, and the means for selectively exposing the first one of the left image sensor and the right image sensor includes a control circuit for activating selected ones of the pixel rows and columns.

17. The camera of claim 16, also including an automatic focusing means, wherein the control circuit operates under control of a control signal, and wherein the control signal is generated by the automatic focusing means.

18. The camera of claim 17, wherein the control circuit processes the control signal so as to maintain the camera's zero parallax point in a desired relation with respect to a focal point determined by the automatic focusing means.

19. The camera of claim 18, wherein the control circuit is capable of processing the control signal to maintain the zero parallax point at any desired one of a first position coincident with the focal point, a second position in front of the focal point, or a third position in back of the focal point.

20. A stereoscopic video camera, including:

a housing;

a left lens having a first optical axis and a right lens having a second optical axis, wherein the left lens and the right lens are mounted in the housing with the first optical axis substantially parallel to the second optical axis;

a left image sensor mounted in the housing along the first optical axis and a right image sensor mounted in the housing along the second optical axis, wherein each of the left and the right image sensor is a solid state mosaic device having pixel rows and columns; and means for selectively exposing a first one of the left image sensor and the right image sensor to different portions of an image focused by a corresponding one of the left lens and the right lens, including a control circuit for activating selected ones of the pixel rows and columns.

21. The camera of claim 20, wherein the control circuit operates in a mode wherein the control circuit tracks centration change as a function of focal length for the left lens and the right lens, and wherein the control circuit activates a set of pixel rows and columns in at least one of the left and the right image sensors, to produce an effective zero relative change in centration.

22. The camera of claim 20, wherein the control circuit operates in a relative magnification control mode in which the control circuit activates pixel rows and columns in the left and the right image sensors to establish an image sensor size for each of the sensors which compensates for mismatched lens magnification between the left lens and the right lens.

23. A stereoscopic video camera, including:

a housing;

a first lens having a first optical axis, a second lens having a second optical axis, and a third lens having a third optical axis, wherein the first lens, the second lens, and the third lens are fixedly mounted in the housing with the first optical axis, the second optical axis, and the third optical axis substantially parallel to each other;

a first image sensor and a second image sensor mounted in the housing; and means for controlling the effective position of at least one of the first image sensor and the second image sensor to selectively expose said at least one of the first image sensor and the second image sensor to different portions of an image focused by a corresponding one of the first lens, the second lens, and the third lens.

24. The camera of claim 23, wherein the first lens is separated from the third lens by a first distance, the first lens is separated from the second lens by a second distance less than the first distance, and the second lens is separated from the third lens by a third distance less than the first distance.

* * * * *

UNITED STATES PATENT AND TRADEMARK OFFICE
CERTIFICATE OF CORRECTION

PATENT NO. : 5,063,441

DATED : November 5, 1991

INVENTOR(S) : LENNY LIPTON and LAWRENCE D. MEYER

It is certified that error appears in the above - identified patent and that said Letters Patent is hereby corrected as shown below:

On the title page, second inventor's name should read in all instances --Lawrence D. Meyer-- instead of "Lawrence D. Meyers";

Column 3, line 51, delete "b" and substitute --by--.

Signed and Sealed this

Sixteenth Day of March, 1993

Attest:

STEPHEN G. KUNIN

*Attesting Officer*　　　　*Acting Commissioner of Patents and Trademarks*